(12) United States Patent
Lecourtier et al.

(10) Patent No.: US 9,334,046 B2
(45) Date of Patent: May 10, 2016

(54) DEVICE FOR MANEUVERING, ON THE GROUND, A DOOR OF AN AIRCRAFT LANDING GEAR

(71) Applicant: MESSIER-BUGATTI-DOWTY, Velizy Villacoublay (FR)

(72) Inventors: Gilbert Lecourtier, Velizy Villacoublay (FR); Pierre-Yves Liegeois, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 623 days.

(21) Appl. No.: 13/624,181

(22) Filed: Sep. 21, 2012

(65) Prior Publication Data

US 2013/0075527 A1 Mar. 28, 2013

(30) Foreign Application Priority Data

Sep. 26, 2011 (FR) ...................... 11 58583

(51) Int. Cl.
| | | |
|---|---|---|
| *B64C 25/16* | (2006.01) | |
| *B64C 25/18* | (2006.01) | |
| *B64C 25/26* | (2006.01) | |
| *B64C 25/28* | (2006.01) | |
| *B64C 25/30* | (2006.01) | |

(52) U.S. Cl.
CPC ................ *B64C 25/30* (2013.01); *B64C 25/16* (2013.01); *B64C 25/18* (2013.01); *B64C 25/26* (2013.01); *B64C 25/28* (2013.01)

(58) Field of Classification Search
CPC ........ B64C 1/14; B64C 1/1446; B64C 25/10; B64C 25/16; B64C 25/18; B64C 25/26; B64C 25/28; B64C 25/30
See application file for complete search history.

(56) References Cited

U.S. PATENT DOCUMENTS

| | | | | |
|---|---|---|---|---|
| 3,403,749 | A | * | 10/1968 | Warren ........................... 182/88 |
| 4,573,649 | A | | 3/1986 | Yourkowski et al. |
| 6,633,239 | B2 | * | 10/2003 | Plude et al. ................... 340/945 |
| 6,854,689 | B1 | | 2/2005 | Lindahl et al. |
| 7,786,615 | B2 | * | 8/2010 | Garcia ........................... 307/41 |
| 2008/0251637 | A1 | * | 10/2008 | Reynes ..................... 244/100 R |

OTHER PUBLICATIONS

French Search Report for corresponding FR 1158583 dated Jun. 5, 2012.

* cited by examiner

*Primary Examiner* — Tien Dinh
*Assistant Examiner* — Richard R Green
(74) *Attorney, Agent, or Firm* — Sughrue Mion, PLLC

(57) ABSTRACT

The invention relates to a device for maneuvering, on the ground, a door of an aircraft landing gear, the door being linked with door maneuvering means and uplock means for locking the door when it reaches the closed position, at least one unlocking electromechanical actuator arranged to act upon the uplock means with a view to deactivating them during opening of the door in flight. According to the invention, the device comprises control means 17 which can be operated by an operator on the ground in order to control at least:
an opening sequence during which the unlocking electromechanical actuator is actuated in order to deactivate the uplock means,
a closing sequence during which the maneuvering means are actuated in order to close the door again.

7 Claims, 3 Drawing Sheets

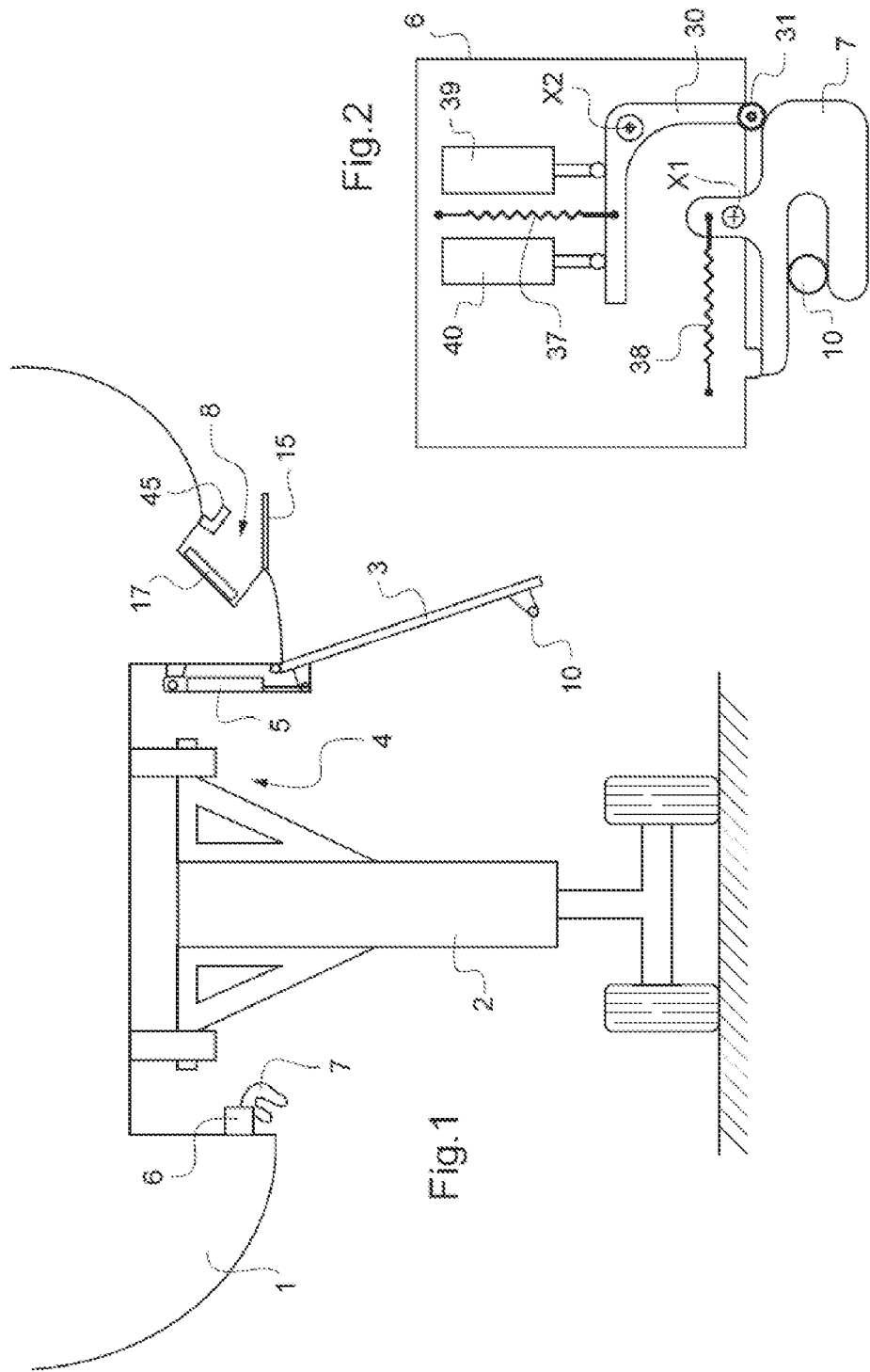

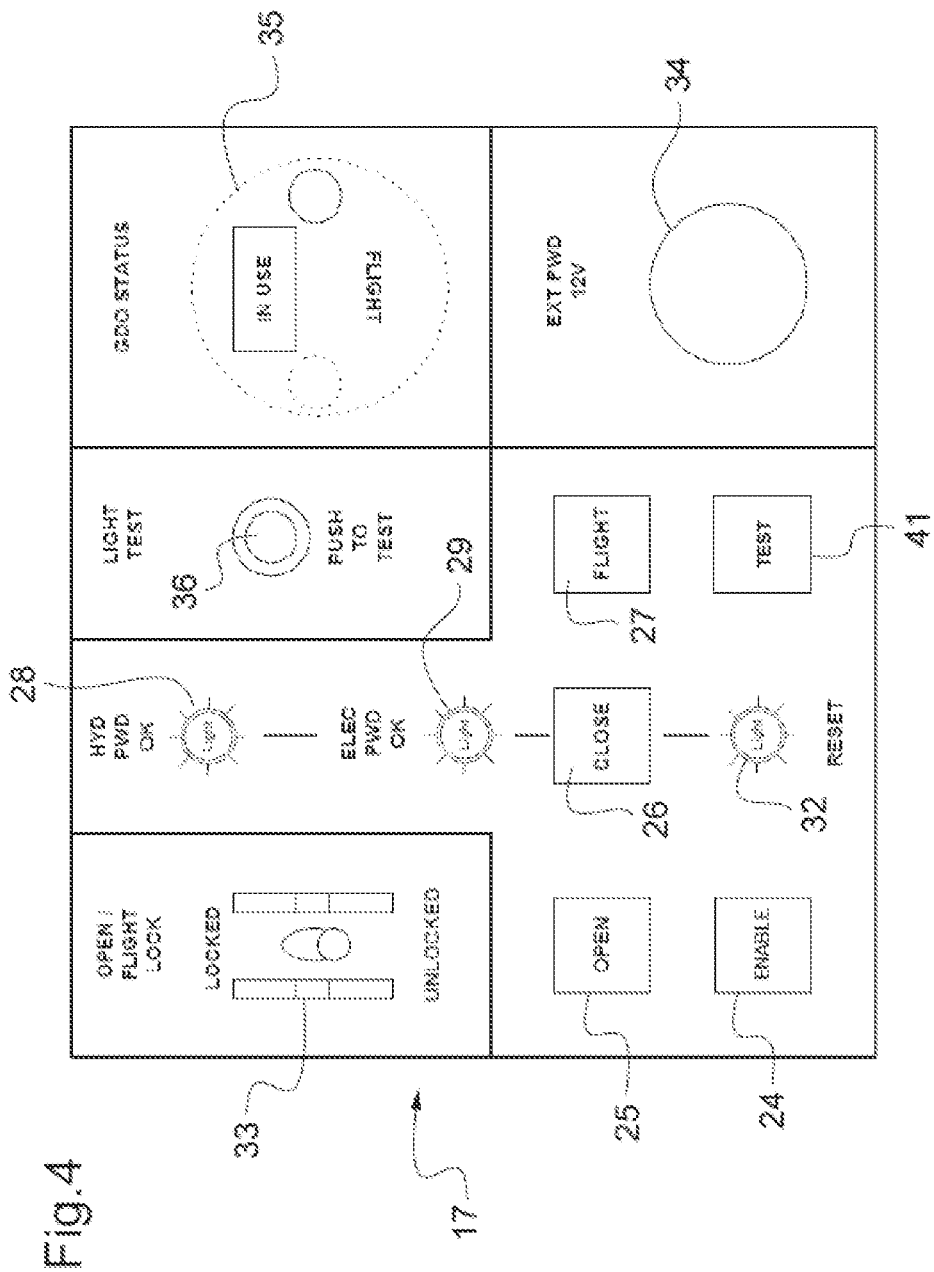

DEVICE FOR MANEUVERING, ON THE GROUND, A DOOR OF AN AIRCRAFT LANDING GEAR the invention relates to a device for manoeuvring, on the ground, a door of an aircraft landing gear.

BACKGROUND TO THE INVENTION

The majority of modern aircraft are provided with retractable landing gear, with compartments for receiving this landing gear when the aircraft is in flight, and doors for closing these compartments. The doors are opened and closed using actuators for manoeuvring the doors, for example cylinders.

When the door reaches the closed position, it is automatically locked in this position by uplock means, for example an uplock box on which is hinged a hook which imprisons a roller fixed on the door. The hook is unhooked using an actuator, which is most often hydromechanical or electromechanical. Frequently, the uplock box includes an emergency actuator which can unlock the hook, if the main actuator can no longer be used.

In flight, the unhooking of this hook and the opening and closing of this door are controlled during the sequences for extending and retracting the landing gear. It should be noted that the doors are closed again and hooked when the landing gear is unfolded.

When the aircraft is on the ground, it is necessary to be able to open the doors, particularly to access the equipment located on the upper part of the landing gear or in the landing gear compartment. To this end, the majority of aircraft include control means that can be operated by the ground staff, for deactivating the uplock means such as to free the doors.

As the power required for these operations, which is generally hydraulic or electric, is not available on the ground, particularly when the engines have stopped, the aircraft includes mechanical control means arranged to deactivate the uplock means when the aircraft is on the ground. These mechanical control means generally comprise a handle connected to the uplock boxes via a linkage.

These mechanical control means are particularly heavy, bulky and therefore expensive for the aircraft manufacturer.

SUBJECT MATTER OF THE INVENTION

The subject matter of the invention is a device for manoeuvring, on the ground, a door of a landing gear, for reducing the weight of the existing devices without making this manoeuvre less safe.

BRIEF DESCRIPTION OF THE INVENTION

With a view to achieving this aim, a device is proposed for manoeuvring, on the ground, a door of an aircraft landing gear, the door being linked with door manoeuvring means and uplock means for locking the door when it reaches the closed position, the uplock means comprising at least one unlocking electromechanical actuator arranged to act upon the uplock means with a view to deactivating them during opening of the door in flight. According to the invention, the device comprises control means which can be operated by an operator on the ground in order to control at least:

an opening sequence during which the unlocking electromechanical actuator is actuated in order to deactivate the uplock means, a closing sequence during which the manoeuvring means are actuated in order to close the door again.

The deactivation, on the ground, of the uplock means through the control of an electromechanical actuator already fitted to the uplock box enables mechanical elements of the control mechanical means to be replaced with electrical elements, contributing to a large saving in weight.

According to a particular embodiment of the invention, the opening device comprises at least two control members arranged such that they must both be actuated to enable control of the unlocking actuator or control of the manoeuvring means.

Therefore, manoeuvring the door cannot be controlled inadvertently through the action of an operator on the ground or any other external cause.

BRIEF DESCRIPTION OF THE DRAWINGS

The invention will be better understood in the light of the following description with reference to the figures of the appended drawings wherein:

FIG. 1 is a schematic front view of an aircraft compartment with the door thereof and the landing gear thereof in the unfolded position, FIG. 2 schematically illustrates an uplock box provided with two actuators, including one electromechanical actuator, FIG. 4 illustrates the control means for the manoeuvring device of FIG. 3.

DETAILED DESCRIPTION OF THE INVENTION

Figure 3:
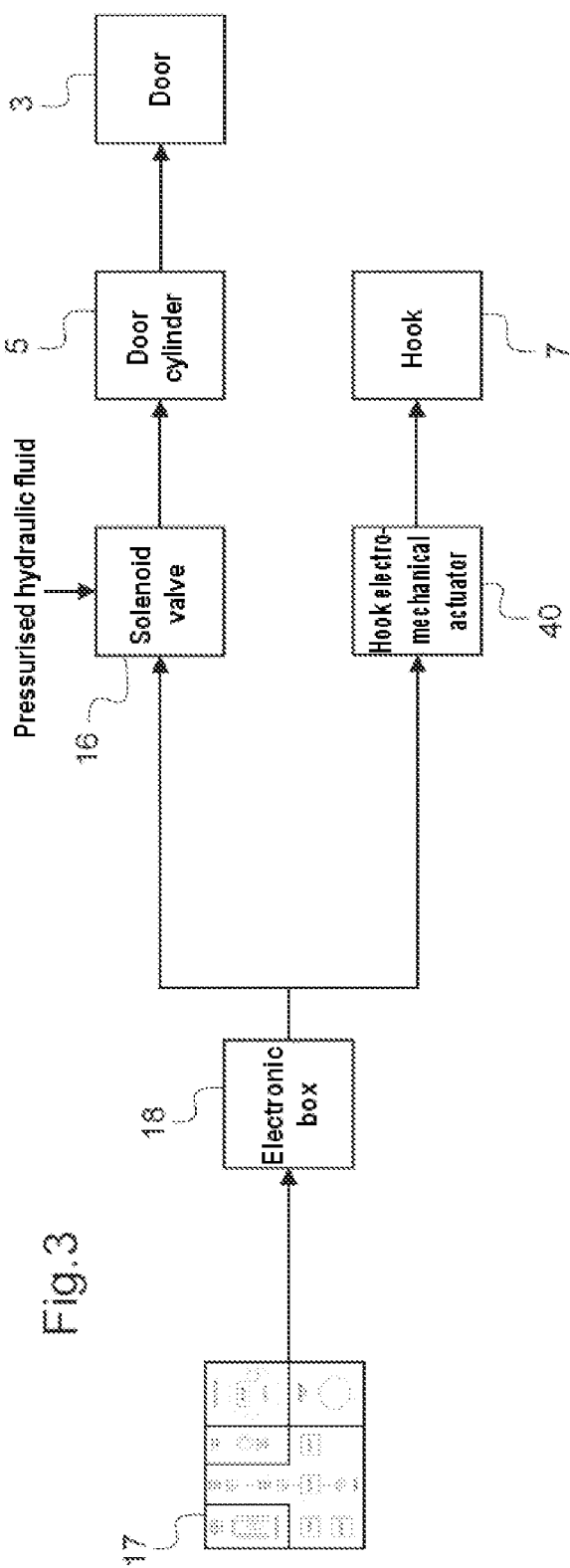
FIG. 3 is a process diagram illustrating the interactions between various elements of the manoeuvring device according to a particular embodiment of the invention.

The aircraft 1 shown in FIG. 1 comprises a landing gear 2 hinged on the structure between an unfolded position illustrated here and a retracted position wherein the landing gear is received in a compartment 4 that can be closed by a door 3. A cylinder 5 connected to the door 3 enables the latter to be manoeuvred. An uplock box 6 provided with a hook 7 enables a knob 10 which is rigidly connected with the door 3 to be hooked when the door 3 reaches the closed position. To control the manoeuvring of the door 3 and the unhooking of the hook 7, the aircraft is provided with control means 17 that can be accessed by opening a panel 15.

FIG. 2 illustrates an uplock box 6, known per se, the hook 7 being shown in the locked position, imprisoning the knob 10 of the door 3. The hook 7 is mounted in a pivoting manner about an axis X1 and is held in the hooked position by a lock 30 which is also pivoted about an axis X2 which is parallel with the axis X1 and comprises a roller 31 engaging a surface of the hook 7 to hold the latter in the hooked position. Springs 37 and 38 return the lock 30 into the locked position and the hook 7 into the unhooked position respectively. Unhooking the hook 7 is controlled, in flight, by a main actuator 39 or by an emergency actuator 40, the two actuators acting on the lock 30 to make it pivot such that the lock 30 frees the hook 7. In this case, the emergency actuator 40 is electromechanical.

The diagram shown in FIG. 3 illustrates the operating principle of a device for opening, on the ground, a door according to a first particular embodiment of the invention. The device includes a control board 17 which can be accessed on the ground by an operator after opening a panel for accessing the control board. The control board 17 includes a certain number of control members (which will be described below) to send commands to a control box 18 which is arranged to control an electrohydraulic solenoid valve connected to the door cylinder 5 and to control the emergency electromechanical actuator 40 of the uplock box. Therefore, it is possible to control at least two sequences:

- an opening sequence during which the emergency electromechanical actuator 40 is actuated in order to free the knob of the door. The solenoid valve 16 is then activated such that the two chambers of the door cylinder 5 are connected, the resulting force opening the door 3 following the door 3 being freed,
- a closing sequence during which the solenoid valve 16 is actuated such that the door cylinder 5 closes the door again. The latter is then automatically hooked when the door reaches the closed position.

The control board 17 is illustrated in greater detail in FIG. 4. It comprises:

- four push-buttons 24, 25, 26, 27, called "ENABLE", "OPEN", "CLOSE", "FLIGHT" respectively,
- indicator lights 28, 29, 32, called "HYD PWD OK", "ELEC PWD OK", "RESET" respectively,
- a switch 33 for activating or deactivating the push-buttons,
- an electrical input 34 for connecting an external power source,
- a push-to-test button 36 for checking, via a pressing action, that the control board 17 operates correctly,
- a state indicator 35.

In the door opening device of the present invention, the control board 17 is located in the space 8 closed by the access panel 15. Door opening control requires pressing of the "ENABLE" push-button 24 then of the "OPEN" push-button 25, which causes the transmission of an electrical order to the control box 18, which then implements the opening sequence.

Door closing control requires pressing of the "ENABLE" push-button 24, then of the "CLOSE" push-button 26, which causes the transmission of an electric order to the electronic box 18 which then implements the closing sequence.

A third sequence called, in this case, an isolation sequence is carried out in the door manoeuvring device; it is controlled by pressing on the "ENABLE" push-button 24, then on the "FLIGHT" push-button 27, and causes electrical isolation between the control board 17 and the rest of the aircraft electrical circuit, for ensuring that no manoeuvre of the door 3 will be triggered in an untimely manner.

The control box 18 can be a box dedicated to controlling the device for manoeuvring the doors on the ground of the invention, or on the contrary, be used simultaneously by another device, for example an in-flight door and/or landing gear manoeuvring device. Therefore, the operations carried out by the control box linked with the ground door manoeuvring device of the present invention are carried out without addition of equipment.

Pressing on the "ENABLE" push-button 24 also enables "HYD PWD OK", "ELEC PWD OK" indicator lights to be activated, which enable the operator to check the availability of the hydraulic and electric power, respectively, which are necessary for the device to operate well.

According to one advantageous aspect of the invention, the electrical consumption of the device is zero except during the progression of the controlled sequences: therefore, the door 3 can be held in the open position when the aircraft is on the ground without the device consuming power.

The control board 17 comprises an electrical input 34 for connecting an external power source to the control means, for example an external battery. External power source supply is used particularly when means of electrical supply coming from the aircraft are not available. The control means also comprise a "GDO STATUS" state indicator 35 which indicates:

- either that the device is in use if the door is open or in the process of being opened or closed or if the control means are not electrically isolated ("IN USE" message)
- or that the device is in a state corresponding to a configuration consistent with take-off for the control means, i.e. at the end of the so-called isolation sequence ("FLIGHT" message).

Preferably, the "GDO STATUS" indicator 35 is an indicator having two stable states, which only consumes power during the transition from one state to the other.

According to a particular aspect of the invention, the "GDO STATUS" indicator 35 is linked with a marker 45 (which can be seen in FIG. 1) which can be moved between a retracted position wherein it enables the panel 15 for accessing the control board 17 to be closed and which corresponds to the "FLIGHT" position of the "GDO STATUS" indicator 35, and a projecting position (shown here) wherein it prevents the panel 15 for accessing the control board 17 from being closed, which corresponds to the "IN USE" position of the "GDO STATUS" indicator 35. Therefore, the pilot can check, during the pre-flight inspection, which state the device of the invention is in, and be warned by the panel 15 remaining open that the device of the invention has not been returned to the "FLIGHT" status.

According to another particular aspect of the invention, the control board 17 comprises a second push-to-test button 41, for checking, via a pressing action, that additional equipment operates correctly. In particular, it is especially advantageous to be able to check on the ground the sound operation of a landing gear uplock box emergency electromechanical actuator unhooking a hook used to lock the landing gear in the retracted position, since aircraft do not generally comprise means for testing this emergency electromechanical actuator in flight. Therefore, pressing on the push-to-test button 41 enables the landing gear uplock box emergency electromechanical actuator to be actuated, wherein the unhooking of the hook can be checked visually from the ground by an operator who will have previously manually put the hook in the hooked position.

The invention is not limited to the particular embodiment which has just been described, but, indeed on the contrary, covers any alternative falling within the scope of the invention as defined by the claims.

Although control means have been described which require successive pressing on two different push-buttons, it is possible of course to apply to this device any type of control action on any type of control member in any type of control sequence which comprises at least two separate actions, such as to prevent an untimely actuation of one of the control members from causing unwanted opening or closing of the controlled door(s).

Furthermore, it is possible to not use a control box 18 between the control means 17 and the linked actuators, the control means 17 then directly controlling the electromechanical actuators.

Furthermore, although an actuator has been described for controlling a valve for feeding a hydromechanical actuator for activating the door, it is possible to directly control an electromechanical actuator in order to directly activate the door.

The invention claimed is:

1. A device for manoeuvring, on the ground, a door (3) of an aircraft (1) landing gear (2), the door (3) being linked with door manoeuvring means (5) and uplock means (7) for locking the door (3) when it reaches the closed position, at least one unlocking electromechanical actuator (40) arranged to act upon the uplock means (7) with a view to deactivating them during opening of the door (3) in flight, characterised in that the device comprises control means (17) which can be operated by an operator on the ground in order to control at least:

an opening sequence during which the unlocking electromechanical actuator (40) is actuated in order to deactivate the uplock means (7), a closing sequence during which the manoeuvring means (5) are actuated in order to close the door again, wherein the control means (17) comprise at least two control members (24, 25, 26) arranged such that they must both be actuated successively in two separate actions to enable control of the unlocking electromechanical actuator (40) or control of the manoeuvring means (5).

2. The device according to claim 1, wherein at least one of the control members (24, 25, 26) is arranged to control a state display member (28, 29) of the device.

3. The device according to claim 2, wherein the control means include at least three control members (24, 25, 26), including the state display control member (24), an opening control member (25) and a closing control member (26), which are arranged such that:

the opening sequence is activated by the actuation of the state display control member (24) and the opening control member (25), the closing sequence is activated by the actuation of the state display control member (24) and the closing control member (26).

4. The device according to claim 1, including at least one indicator (35) which can be seen on the ground in order to indicate a state of the device.

5. The device according to claim 4, wherein the indicator (35) comprises means (45) for blocking in the open position a panel (15) for accessing the control means (17) of the device, which are arranged such that:

these means are activated at the end of the opening sequence, these means are deactivated after the end of the closing sequence.

6. The device according to claim 1, wherein the control means (17) comprise a test control member (41) for checking that additional equipment operates correctly.

7. The device according to claim 6, wherein the additional equipment to be tested is a landing gear uplock box emergency electromechanical actuator.

* * * * *